(12) United States Patent
Han et al.

(10) Patent No.: US 12,511,100 B2
(45) Date of Patent: Dec. 30, 2025

(54) SYSTEM-ON-A-CHIP INCLUDING SOFT FLOAT FUNCTION CIRCUIT

(71) Applicant: Electronics and Telecommunications Research Institute, Daejeon (KR)

(72) Inventors: Kyuseung Han, Daejeon (KR); Kyung Jin Byun, Daejeon (KR); Sukho Lee, Daejeon (KR); Jae-Jin Lee, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 123 days.

(21) Appl. No.: 18/362,596

(22) Filed: Jul. 31, 2023

(65) Prior Publication Data

US 2024/0036817 A1   Feb. 1, 2024

(30) Foreign Application Priority Data

Aug. 1, 2022   (KR) .......................... 10-2022-0095195
Jun. 1, 2023   (KR) .......................... 10-2023-0071114

(51) Int. Cl.
*G06F 9/38* (2018.01)
*G06F 1/3234* (2019.01)
*G06F 5/01* (2006.01)
*G06F 15/78* (2006.01)

(52) U.S. Cl.
CPC ............ *G06F 5/012* (2013.01); *G06F 1/3234* (2013.01); *G06F 15/7807* (2013.01)

(58) Field of Classification Search
CPC .... G06F 9/30014; G06F 9/3877; G06F 9/455; G06F 15/7807
See application file for complete search history.

(56) References Cited

U.S. PATENT DOCUMENTS

| 4,841,476 A * | 6/1989 | Mitchell | G06F 9/3879 712/E9.037 |
| 8,447,957 B1 * | 5/2013 | Carrillo | G06F 13/1684 712/225 |
| 11,366,638 B1 | 6/2022 | Oklobdzija et al. | |
| 11,429,838 B2 | 8/2022 | Kim et al. | |
| 2009/0113186 A1 | 4/2009 | Kato et al. | |
| 2012/0323552 A1 * | 12/2012 | Lau | G06F 11/0772 703/26 |
| 2013/0173682 A1 * | 7/2013 | Radmilac | G06F 7/483 708/507 |

(Continued)

FOREIGN PATENT DOCUMENTS

| JP | 2009-110353 | 5/2009 |
| KR | 10-2018-0095385 | 8/2018 |

(Continued)

*Primary Examiner* — Jacob Petranek
(74) *Attorney, Agent, or Firm* — KILE PARK REED & HOUTTEMAN PLLC

(57) ABSTRACT

Disclosed is an SoC including a CPU that generates a first function signal including a first command for a first soft float function while not having a floating point operation function, a system bus, and a soft float function circuit that receives the first function signal from the CPU through the system bus, and performs a first floating point operation corresponding to the first soft float function based on the first command.

10 Claims, 5 Drawing Sheets

(56) References Cited

U.S. PATENT DOCUMENTS

2016/0274636 A1 9/2016 Kim
2019/0318097 A1 10/2019 Katragada et al.
2022/0206747 A1 6/2022 Langhammer et al.

FOREIGN PATENT DOCUMENTS

| KR | 10-2019-0016786 | 2/2019 |
| KR | 10-2020-0061164 | 6/2020 |
| KR | 10-2022-0074702 | 6/2022 |
| KR | 10-2022-0092367 | 7/2022 |
| WO | WO-2023035053 A1 * | 3/2023 |

* cited by examiner

SYSTEM-ON-A-CHIP INCLUDING SOFT FLOAT FUNCTION CIRCUIT

CROSS-REFERENCE TO RELATED APPLICATIONS

This application claims priority under 35 U.S.C. § 119 to Korean Patent Application No. 10-2022-0095195 filed on Aug. 1, 2022, and No. 10-2023-0071114 filed on Jun. 1, 2023, in the Korean Intellectual Property Office, the disclosures of which are incorporated by reference herein in their entireties.

BACKGROUND

Embodiments of the present disclosure described herein relate to an integrated circuit, and more particularly, relate to a system-on-chip (SoC) including a soft float function circuit.

An SoC includes a central processing unit (CPU) and a hardware intellectual property (IP) blocks. The hardware IP block refers to a semiconductor circuit responsible for a specific function used in the SoC.

When the SoC is running, a floating point operation may be required. To this end, the CPU of the SoC may include hardware performing the floating point operation. Moreover, the CPU may perform the floating point operation in a software manner, without hardware performing a separate floating point operation.

When the CPU performs the floating point operation, power consumption of the SoC may increase or performance of the SoC may decrease.

SUMMARY

Embodiments of the present disclosure provide an SoC including a soft float function circuit.

According to an embodiment, a system-on-chip (SoC) includes a central processing unit (CPU) that generates a first function signal including a first command for a first soft float function while not having a floating point operation function, a system bus, and a soft float function circuit that receives the first function signal from the CPU through the system bus, and performs a first floating point operation corresponding to the first soft float function based on the first command.

In an embodiment, the first function signal further includes a first parameter for the first soft float function. The soft float function circuit further includes a storage device configured to store the first command and the first parameter.

In an embodiment, the storage device includes at least one of a first-in-first-out (FIFO) storage device, a register, and a memory.

In an embodiment, the soft float function circuit further includes a plurality of floating point units (FPUs), each of which performs a floating point operation, and a controller that controls the plurality of FPUs and the storage device such that at least one FPU among the FPUs performs the first floating point operation in response to the first function signal.

In an embodiment, the CPU further generates a second function signal including a second command for a second soft float function. The soft float function circuit is further configured to perform the first floating point operation corresponding to the first soft float function based on the first command when receiving the first function signal from the CPU through the system bus, and to perform a second floating point operation corresponding to the second soft float function based on the second command when receiving the second function signal from the CPU through the system bus.

In an embodiment, when the soft float function circuit simultaneously receives the first function signal and the second function signal, the controller is further configured to allow the plurality of FPUs and the storage device to perform the second floating point operation after the plurality of FPUs perform the first floating point operation.

In an embodiment, when the soft float function circuit simultaneously receives the first function signal and the second function signal, the controller is configured to control the plurality of FPUs and the storage device such that the plurality of FPUs perform the first floating point operation and the second floating point operation in parallel.

In an embodiment, the system bus is connected to the CPU through a first interface and is connected to the soft float function circuit through a second interface. The soft float function circuit is configured to receive the first function signal from the CPU through the first interface, the system bus, and the second interface.

In an embodiment, the SoC further includes a memory device connected to the system bus through a third interface. The soft float function circuit is further connected to the system bus through a fourth interface.

In an embodiment, a transmission rate of the fourth interface is faster than a transmission rate of the second interface.

In an embodiment, the soft float function circuit further includes a direct memory access (DMA) engine that performs a DMA operation between the soft float function circuit and the memory device. The soft float function circuit receives a data signal including data required to perform the first floating point operation from the memory device through the third interface, the fourth interface, and the system bus based on the DMA operation.

According to an embodiment, an SoC includes a system bus, a CPU connected to the system bus through a first interface and configured to generate a first function signal including a first command for a first soft float function, and a second function signal including a second command for a second soft float function while not having a floating point operation function, a first soft float function circuit connected to the system bus through a second interface and receiving the first function signal from the CPU through the first interface, the system bus, and the second interface and performing a first floating point operation corresponding to the first soft float function based on the first command, a second soft float function circuit connected to the system bus through a third interface and receiving the second function signal from the CPU through the first interface, the system bus, and the third interface and performing a second floating point operation corresponding to the second soft float function based on the second command, and a memory device connected to the system bus through a fourth interface and storing first data required for the first floating point operation, and second data required for the second floating point operation.

In an embodiment, the first function signal further includes a first parameter for the first soft float function. The first soft float function circuit further includes a first storage device that stores the first command and the first parameter.

In an embodiment, the first soft float function circuit further includes a plurality of first FPUs, each of which performs a floating point operation, and a first controller that controls the plurality of first FPUs and the first storage device such that at least one first FPU among the plurality of first FPUs performs the first floating point operation in response to the first function signal.

In an embodiment, the first soft float function circuit further includes a DMA engine further connected to the system bus through a fifth interface and performing a DMA operation between the first soft float function circuit and the memory device. The first soft float function circuit receives a first data signal including the first data from the memory device through the fourth interface, the system bus, and the fifth interface. A transmission rate of the fifth interface is faster than a transmission rate of the second interface.

In an embodiment, the SoC operates during a first period. During the first period, the first soft float function circuit and the second soft float function circuit are selectively turned on.

BRIEF DESCRIPTION OF THE FIGURES

The above and other objects and features of the present disclosure will become apparent by describing in detail embodiments thereof with reference to the accompanying drawings.

DETAILED DESCRIPTION

Hereinafter, embodiments of the present disclosure will be described in detail and clearly to such an extent that an ordinary one in the art easily implements the present disclosure. In the description below, the terms "block", "unit", "module", etc. or components corresponding to the terms may be implemented in the form of software, hardware, or a combination thereof.

In the following drawings or in the detailed description, modules may be connected with any other components except for components illustrated in a drawing or described in the detailed description. Modules or components may be connected directly or indirectly. Modules or components may be connected through communication or may be physically connected.

Figure 1:
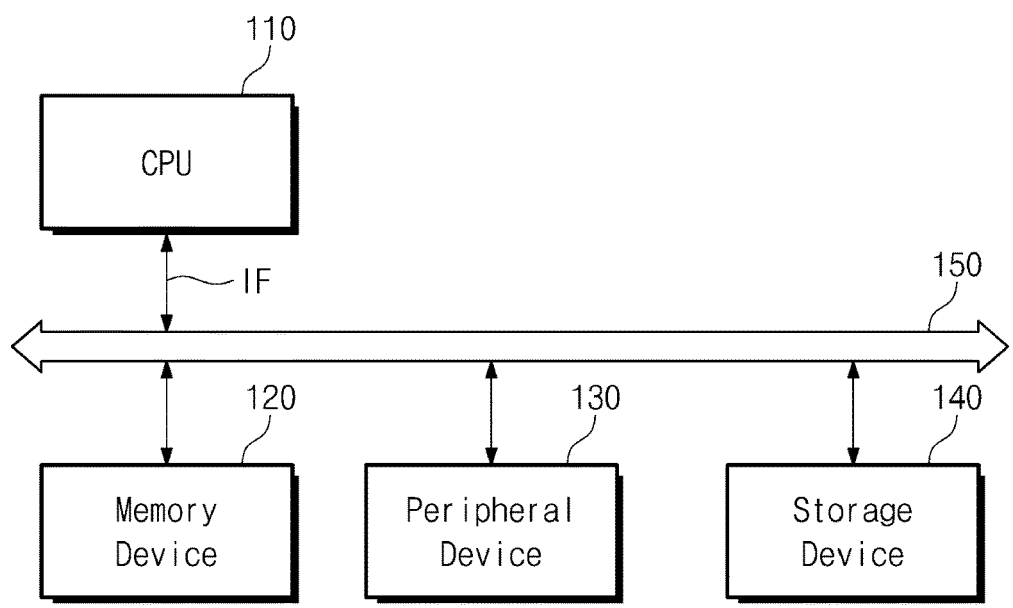
FIG. 1 is a block diagram showing an SoC.

FIG. 1 is a block diagram showing an SoC. Referring to FIG. 1, an SoC 100 may include a CPU 110, a memory device 120, a peripheral device 130, a storage device 140, and a system bus 150.

The SoC 100 may control the overall operation of an electronic device (not shown) including the SoC 100. For example, SoC 100 may be an application processor (AP) configured to control the overall operations of an electronic device. The SoC 100 may execute an operating system, a program, or an application, which is executable on the electronic device. For example, the SoC 100 may be included in a device (hereinafter, referred to as an "IoT device") used in Internet-of-Things (IoT) technology.

The CPU 110 may perform various operations performed by the electronic device and may process data. The CPU 110 may communicate with other devices (e.g., the memory device 120, the peripheral device 130, and the storage device 140) through the system bus 150.

The CPU 110 may have a large size, may perform high-speed operations (or an operating frequency is high), and may be responsible for general-purpose operations. For example, the CPU 110 may perform an integer operation and a floating point operation.

For example, in response to signals received from the CPU 110, the memory device 120 may store data or may provide the stored data to the CPU 110. In an embodiment, the memory device 120 may be a static random access memory (SRAM) or a dynamic random access memory (DRAM) device, but the scope of the present disclosure is not limited thereto.

For example, when the SoC 100 is included in the IoT device, the memory device 120 may include only the SRAM to reduce manufacturing costs.

The peripheral device 130 may be a device configured to perform various functions. In an embodiment, the peripheral device 130 may be a separate hardware device such as a MODulator and DEModulator (MODEM), a graphics processing unit (GPU), an input/output processor, a display unit, a touch input device, an audio processor, and a communication system.

The storage device 140 may be a storage medium of the SoC 100. The storage device 140 may store application programs, an OS image, and various pieces of data. The storage device 140 may be a memory card such as MMC, eMMC, SD, or MicroSD. Alternatively, the storage device 140 may include a non-volatile memory such as a NAND flash memory, a NOR flash memory, a PRAM, an MRAM, an ReRAM, a FRAM, and the like.

The system bus 150 may be connected to the components 110 to 140 of the SoC 100 through interfaces IF. The system bus 150 may be a passage through which data or signals are transmitted between the components 110 to 140 of the SoC 100.

For example, the CPU 110 may include a hardware device for performing a floating point operation. In this case, the CPU 110 may perform the floating point operation through a hardware device. However, a hardware device for performing the floating point operation may need to be operated even when not performing the floating point operation. Accordingly, power consumption of the SoC 100 may increase. In addition, design costs for designing the CPU 110 including the hardware device for performing the floating point operation may increase.

Because an IoT device needs to be included in a specific thing, the IoT device may need to operate while consuming low power. When the CPU 110 of the SoC 100 included in the IoT device includes a hardware device for performing the floating point operation, as described above, power consumption may increase. Accordingly, the CPU 110 of the SoC 100 included in the IoT device may need not to include a hardware device performing the floating point operation.

To perform the floating point operation without a separate hardware device, the CPU 110 may use a soft-float technique. The soft-float technique may refer to a technique for performing the floating point operation by using a soft float function without a separate hardware device. In a case of using the soft-float technique, the CPU 110 may perform the floating point operation in a software manner by using only an integer operation.

When the CPU 110 performs the floating point operation through the soft-float technique, the type of a soft float function used for the floating point operation and a code size thereof may vary. Table 1 shows examples of the type of the soft float function and the code size thereof.

TABLE 1

| Name of soft float function | Code size (Byte) |
| --- | --- |
| __adddf3 | 1984 |
| __subsf3 | 1100 |
| __divdfl3 | 1740 |
| __floatdidf | 524 |
| __floatsidf | 172 |
| __floatunsidf | 132 |
| __floatsisf | 264 |
| atof | 5088 |

Referring to Table 1, the size of a software code including the soft float function may be greater than the size of the software code required for an integer operation.

As described above, when the SoC 100 is included in the IoT device, the memory device 120 may include only the SRAM. Accordingly, the capacity of the memory device 120 may be smaller than that in a case of using DRAM. Because the size of the software code including the soft float function is large and the capacity of the memory device 120 is small, the CPU 110 may need excessive frequent access to the storage device 140 when the CPU 110 uses the soft-float technique to perform the floating point operation. Accordingly, the operation speed of the SoC 100 may be slowed down and overall performance may be degraded.

Accordingly, an SoC including a CPU performing the floating point operation by using the soft-float technique may not be suitable for use in an IoT device.

Figure 2:
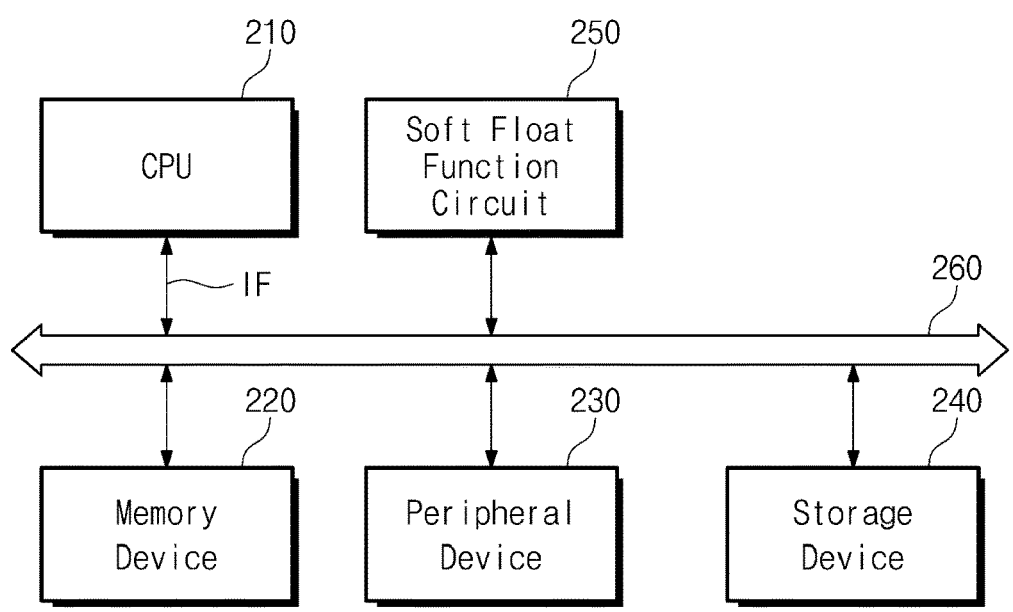
FIG. 2 is a block diagram showing an SoC, according to an embodiment of the present disclosure.

FIG. 2 is a block diagram showing an SoC, according to an embodiment of the present disclosure. Referring to FIG. 2, an SoC 200 may include a CPU 210, a memory device 220, a peripheral device 230, a storage device 240, a soft float function circuit 250, and a system bus 260.

The SoC 200 may control the overall operation of an electronic device (not shown) including the SoC 200. For example, SoC 200 may be an application processor (AP) configured to control the overall operations of an electronic device. The SoC 200 may execute an operating system, a program, or an application, which is executable on the electronic device. In an embodiment, the SoC 200 may be included in an IoT device.

The CPU 210 may perform various integer operations performed by the electronic device and may process data. The CPU 110 may communicate with other devices (e.g., the memory device 220, the peripheral device 230, the storage device 240, and the soft float function circuit 250) through the system bus 260. Unlike the case of FIG. 1, the CPU 210 may perform only the integer operation. That is, the CPU 210 may not have a floating point operation function.

The CPU 210 may generate a function signal related to the floating point operation. The function signal may include a command for a target soft float function and parameters for the target soft float function.

For example, the CPU 210 may generate a first function signal including a first command for a first soft float function, and may generate a second function signal including a second command for a second soft float function.

For example, in response to signals received from the CPU 210, the memory device 220 may store data or may provide the stored data to the CPU 210. In an embodiment, the memory device 220 may be a static random access memory (SRAM) or a dynamic random access memory (DRAM) device, but the scope of the present disclosure is not limited thereto.

In an embodiment, the memory device 220 may deliver, to the soft float function circuit 250, the stored data in response to signals received from the soft float function circuit 250.

For example, when the SoC 200 is included in the IoT device, the memory device 220 may include only the SRAM to reduce manufacturing costs.

The peripheral device 230 may be a device configured to perform various functions. In an embodiment, the peripheral device 230 may be a separate hardware device such as a MODulator and DEModulator (MODEM), a graphics processing unit (GPU), an input/output processor, a display unit, a touch input device, an audio processor, and a communication system.

The storage device 240 may be a storage medium of the SoC 200. The storage device 240 may store application programs, an OS image, and various pieces of data. The storage device 240 may be a memory card such as MMC, eMMC, SD, or MicroSD. Alternatively, the storage device 240 may include a non-volatile memory such as a NAND flash memory, a NOR flash memory, a PRAM, an MRAM, an ReRAM, a FRAM, and the like.

The soft float function circuit 250 may receive a function signal from the CPU 210 through the system bus 260. The soft float function circuit 250 may perform a floating point operation for implementing a function of a soft float function corresponding to a command included in the function signal. That is, the soft float function circuit 250 may perform the floating point operation corresponding to the target soft float function.

In other words, the soft float function circuit 250 may be a hardware device for implementing the function of the target soft float function. The soft float function circuit 250 may identify the target soft float function based on the command included in the function signal, and may perform the floating point operation corresponding to the target soft float function.

In other words, according to an embodiment of the present disclosure, an SoC including a CPU performing only the integer operation and a soft float function circuit performing the floating point operation may be provided. The CPU may not include a hardware device for performing the floating point operation. Also, the CPU may not perform the floating point operation by using a soft float function having a large data size (That is, the CPU may not perform the floating point operation using the soft float function technique). In the meantime, the floating point operation may be performed by a soft float function circuit provided separately from the CPU. The soft float function circuit may perform a floating point operation corresponding to the target soft float function. Accordingly, the SoC capable of performing the floating point operation without performance degradation or power consumption may be provided.

The system bus 260 may be connected to the components 210 to 250 of the SoC 200 through interfaces IF. The system bus 260 may be a passage through which data or signals are transmitted between the components 210 to 250 of the SoC 200.

Figure 3:
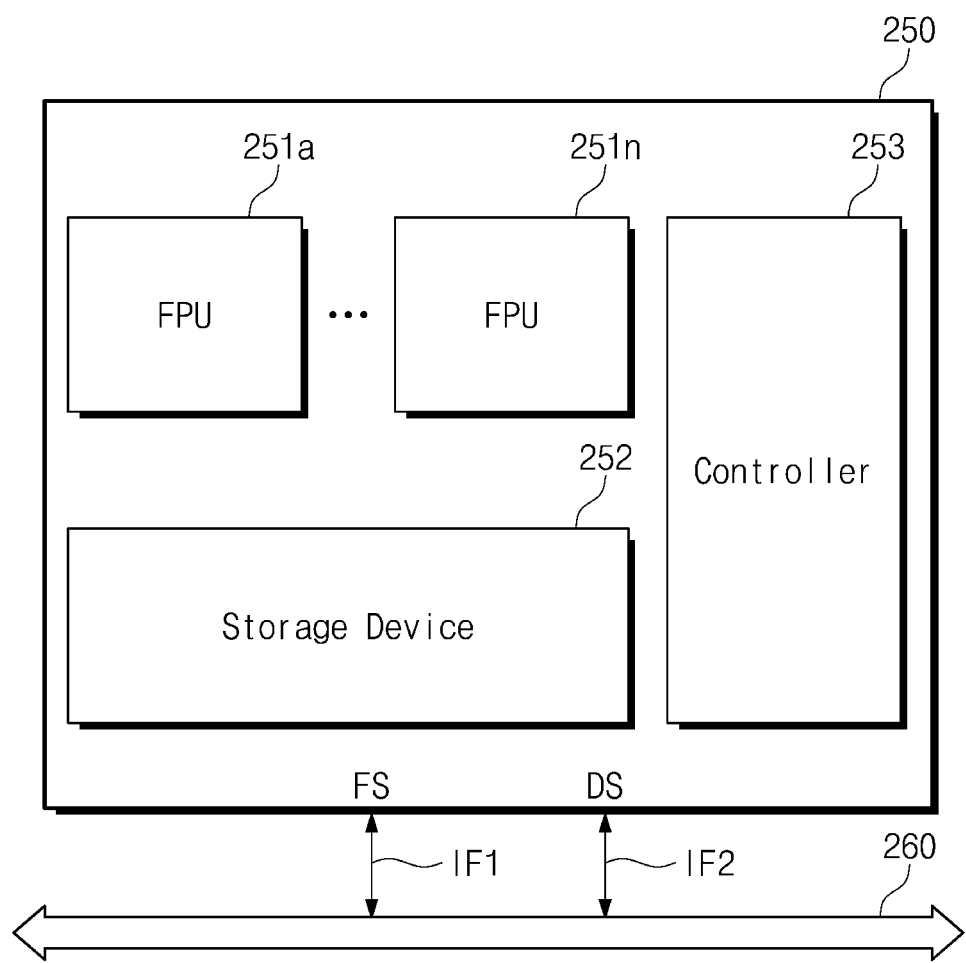
FIG. 3 is a block diagram showing an example of a soft float function circuit of FIG. 2.

FIG. 3 is a block diagram showing an example of a soft float function circuit of FIG. 2. Referring to FIG. 3, the soft float function circuit 250 may include floating point units (FPU) 251a to 251n, a storage device 252, and a controller 253.

For example, the soft float function circuit 250 may be connected to the system bus 260 through a first interface I1 and a second interface I2. The soft float function circuit 250 may receive a function signal FS from the CPU 210 (in FIG.

2) through the first interface IF1 and the system bus 260. The function signal FS may include a command for a target soft float function and parameters for the target soft float function.

Moreover, the soft float function circuit 250 may receive a data signal DS from the CPU 210 (in FIG. 2) through the second interface IF2 and the system bus 260. The data signal DS may include pieces of data stored in the memory device 220 (in FIG. 2). The pieces of data stored in the memory device 220 (in FIG. 2) may be data required to perform a floating point operation corresponding to a target soft float function.

In an embodiment, the transmission rate of the second interface IF2 may be higher than that of the first interface IF1.

Each of the FPUs 251a to 251n may perform the floating point operation for implementing a function of the target soft float function. For example, each of the FPUs 251a to 251n may be configured in an optimized form to implement the function of the target soft float function. In an embodiment, each of the FPUs 251a to 251n may be a binary floating point unit, a decimal floating point unit, or other floating point units.

FIG. 3 illustrates that the soft float function circuit 250 includes the plurality of FPUs 251a to 251n, but the present disclosure is not limited thereto.

In an embodiment, unlike that shown in FIG. 3, the soft float function circuit 250 may not include the FPUs 251a to 251n. In this case, the soft float function circuit 250 may include one or more integer operators. The integer operators may perform a floating point operation corresponding to the target soft float function.

The storage device 252 may store pieces of data included in signals received through the first interface. For example, the storage device 252 may include one of a first-in-first-out (FIFO) storage device, a register, and a memory.

The controller 253 may control the component 251a to 251n and 252 of the soft float function circuit 250. Under control of the controller 253, the FPUs 251a to 251n may perform the floating point operation corresponding to the target soft float function.

In an embodiment, the soft float function circuit 250 may perform the floating point operation corresponding to one soft float function. In an embodiment, the soft float function circuit 250 may perform floating point operations respectively corresponding to a plurality of soft float functions.

Figure 4:
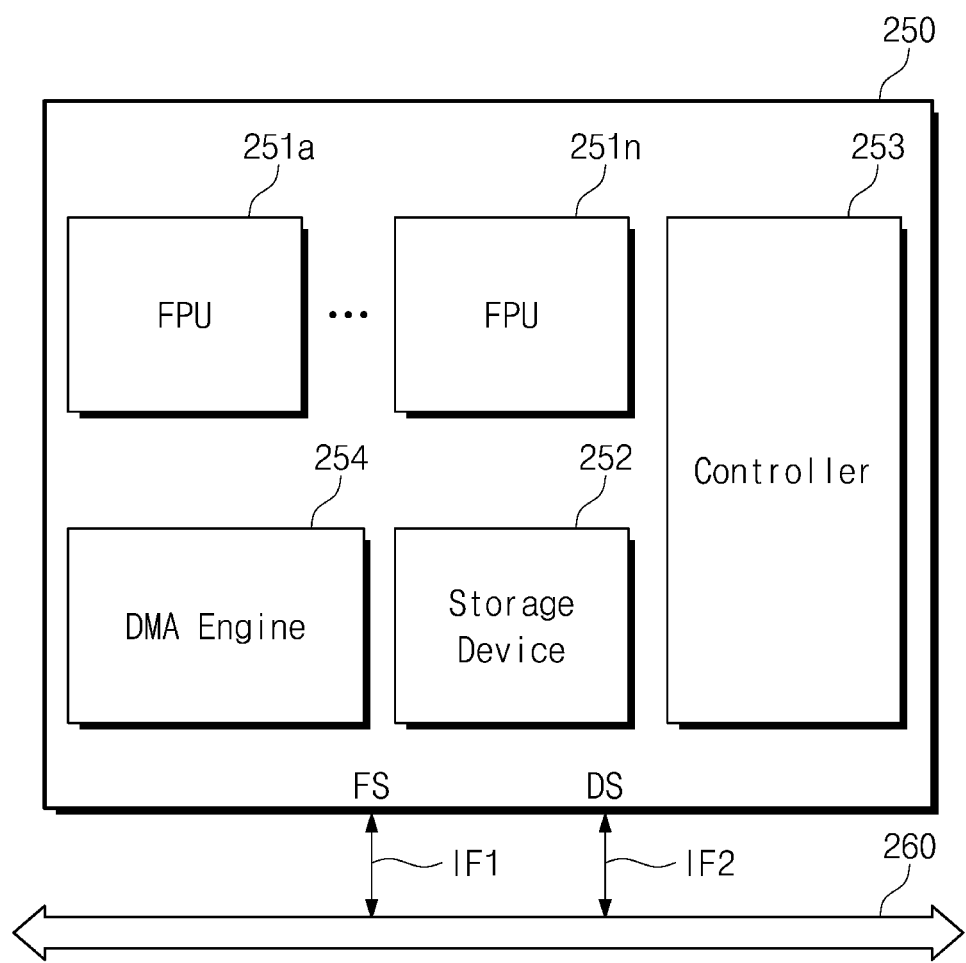
FIG. 4 is a block diagram showing another example of a soft float function circuit of FIG. 2.

FIG. 4 is a block diagram showing another example of a soft float function circuit of FIG. 2. Referring to FIG. 4, the soft float function circuit 250 may include the FPUs 251a to 251n, the storage device 252, the controller 253, and a direct memory access (DMA) engine 254.

For example, the soft float function circuit 250 may be connected to the system bus 260 through the first interface IF1 and the second interface IF2. The soft float function circuit 250 may receive the function signal FS from the CPU 210 (in FIG. 2) through the first interface IF1 and the system bus 260. The function signal FS may include a command for a target soft float function and parameters for the target soft float function.

Moreover, the soft float function circuit 250 may receive the data signal DS from the memory device 220 (in FIG. 2) through the second interface IF2 and the system bus 260. The data signal DS may include pieces of data stored in the memory device 220 (in FIG. 2). The pieces of data stored in the memory device 220 (in FIG. 2) may be data required to perform a floating point operation corresponding to a target soft float function.

Only the one first interface IF1 and the one second interface IF2 are shown in FIG. 4, but the present disclosure is not limited thereto. The number of interfaces IF1 and IF2 and the type of hardware may be determined depending on the type of data required to perform the floating point operation, the performance of an SoC, and the purpose. That is, the soft float function circuit 250 may be connected to the system bus 260 by the plurality of first interface IF1 and the plurality of second interface IF2.

In an embodiment, a transmission rate through the second interface IF2 may be faster than a transmission rate through the first interface IF1.

Each of the FPUs 251a to 251n may perform the floating point operation for implementing a function of the target soft float function. For example, each of the FPUs 251a to 251n may be configured in an optimized form to implement the function of the target soft float function. In an embodiment, each of the FPUs 251a to 251n may be a binary floating point unit, a decimal floating point unit, or other floating point units.

FIG. 4 illustrates that the soft float function circuit 250 includes the plurality of FPUs 251a to 251n, but the present disclosure is not limited thereto.

In an embodiment, unlike that shown in FIG. 4, the soft float function circuit 250 may not include the FPUs 251a to 251n. In this case, the soft float function circuit 250 may include one or more integer operators. The integer operators may perform a floating point operation corresponding to the target soft float function.

The storage device 252 may store pieces of data included in a signal received through the first interface. For example, the storage device 252 may include a FIFO storage device, a register, a memory, or the like.

The controller 253 may control the component 251a to 254 of the soft float function circuit 250. Under control of the controller 253, the FPUs 251a to 251n may perform the floating point operation corresponding to the target soft float function.

The DMA engine 254 may be a hardware device that controls a DMA operation between the soft float function circuit 250 and the memory device 220 (in FIG. 2) without intervention of the CPU 210 (in FIG. 2).

On the basis of the operation of the DMA engine 254, the soft float function circuit 250 may perform DMA-based communication with the memory device 220 (in FIG. 2). Accordingly, the soft float function circuit 250 may receive a data signal from the memory device 220 (in FIG. 2) through the second interface IF2 and the system bus 260. The data signal may include data necessary for the floating point operation corresponding to the target soft float function.

In an embodiment, the soft float function circuit 250 may implement a function of one soft float function.

In an embodiment, the soft float function circuit 250 may implement functions of a plurality of soft float functions. For example, at a first time point, the soft float function circuit 250 may receive a first function signal including a first command for a first soft float function from the CPU 210 (in FIG. 2). In this case, the controller 253 may control the FPUs 251a to 251n. Accordingly, the FPUs 251a to 251n may perform a first floating point operation corresponding to the first soft float function. Afterward, at a second time point, the soft float function circuit 250 may receive a second function signal including a second command for a second soft float function from the CPU 210 (in FIG. 2). In this case, the controller 253 may control the FPUs 251a to 251n. Accordingly, the FPUs 251a to 251n may perform a second floating point operation corresponding to the second soft float function. That is, on the basis of an operation of the controller 253, the soft float function circuit 250 may sequentially perform floating point operations for implementing functions of the plurality of soft float functions.

In an embodiment, the soft float function circuit 250 may implement functions of one or more soft float functions. For example, at a first time point, the soft float function circuit 250 may receive the first function signal including the first command for the first soft float function, and a second function signal including a second command for a second soft float function from the CPU 210 (in FIG. 2). In this case, the controller 253 may control the FPUs 251a to 251n.

For example, the controller 253 may allow some of the FPUs 251a to 251n to perform the first floating point operation for performing a function of the first soft float function, and may allow the other thereof to perform the second floating point operation to perform a function of the second soft float function. That is, on the basis of the operation of the controller 253, the soft float function circuit 250 may perform floating point operations respectively corresponding to a plurality of soft float functions in parallel.

For example, the controller 253 may allow the FPUs 251a to 251n to first perform the first floating point operation corresponding to the first soft float function. After the first floating point operation is completely performed, the controller 253 may allow the FPUs 251a to 251n to perform the second floating point operation corresponding to the second soft float function. That is, on the basis of the operation of the controller 253, the soft float function circuit 250 may sequentially perform floating point operations respectively corresponding to a plurality of soft float functions.

In other words, on the basis of the operation of the controller 253, the soft float function circuit 250 may, sequentially or in parallel, perform floating point operations respectively corresponding to a plurality of soft float functions.

As mentioned above, an SoC according to an embodiment of the present disclosure may include a soft float function circuit and a CPU that does not include hardware for performing a floating point operation. According to an embodiment of the present disclosure, the CPU may perform only an integer operation, and the soft float function circuit may perform only a floating point operation. Accordingly, according to an embodiment of the present disclosure, an SoC operating at high speed while consuming less power may be provided.

Figure 5:
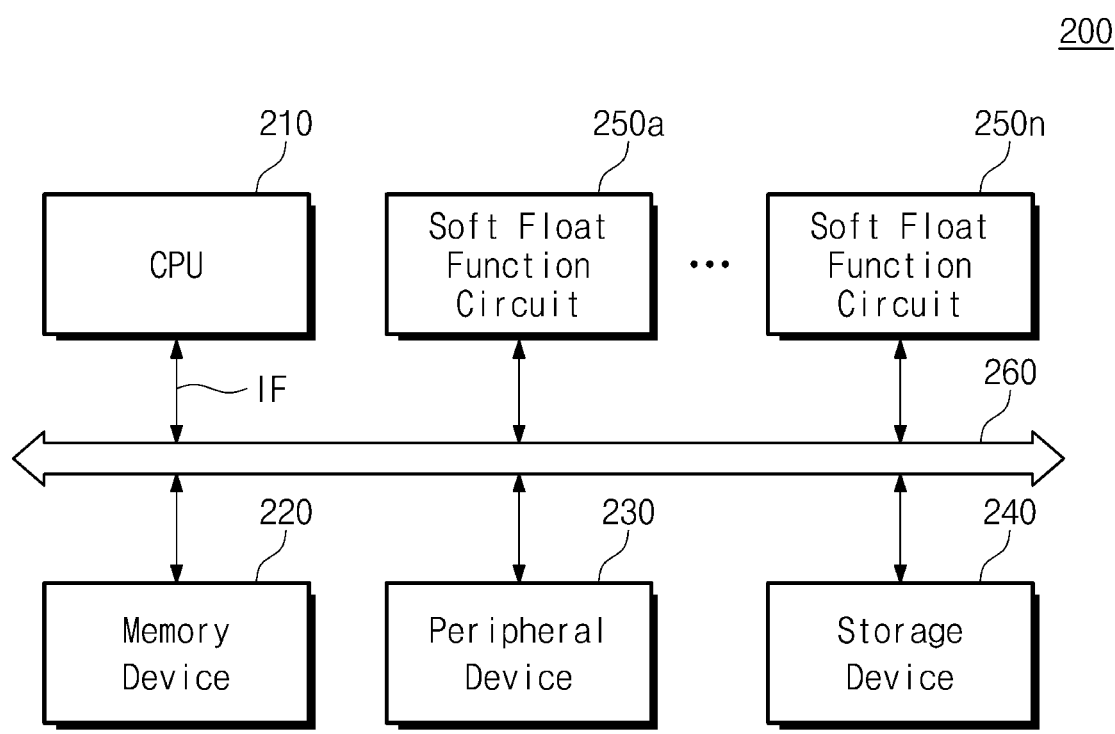
FIG. 5 is a diagram for describing another example of an SoC, according to an embodiment of the present disclosure.

FIG. 5 is a diagram for describing another example of an SoC, according to an embodiment of the present disclosure. Referring to FIG. 5, an SoC 200 may include a CPU 210, a memory device 220, a peripheral device 230, a storage device 240, a plurality of soft float function circuits 250a to 250n, and a system bus 260.

The CPU 210, the memory device 220, the peripheral device 230, the storage device 240, and the system bus 260 are as described above with respect to FIG. 2. Each of the plurality of soft float function circuits 250a to 250n may have the same configuration as the soft float function circuit 250 described with reference to FIG. 3 or FIG. 4.

In an embodiment, all of the plurality of soft float function circuits 250a to 250n may perform a floating point operation for implementing the function of the same soft float function.

In an embodiment, the plurality of soft float function circuits 250a to 250n may perform floating point operations corresponding to different soft float functions, respectively. For example, the first soft float function circuit 250a may perform a first floating point operation corresponding to a first soft float function, and the n-th soft float function circuit 250n may perform an n-th floating point operation corresponding to a n-th soft float function.

In this case, the first soft float function circuit 250a may perform the first floating point operation only when receiving the first function signal. The n-th soft float function circuit 250n may perform the n-th floating point operation only when receiving the n-th function signal. At this time, the first function signal may include a command related to the first soft float function. The n-th function signal may include a command related to the n-th soft float function.

For example, the CPU 210 may be configured to transmit the first function signal to the first soft float function circuit 250a and to transmit the n-th function signal to the n-th soft float function circuit 250n, through the system bus 260. That is, the CPU 210 may be configured to transmit the generated function signal to a soft float function circuit that performs a floating point operation corresponding to a soft float function related to the generated function signal.

For example, the number of soft float function circuits 250a to 250n and the number of functions of soft float functions, which are respectively implemented by the soft float function circuits 250a to 250n, may be determined in consideration of various conditions such as the performance, area, and power consumption of the SoC 200.

In an embodiment, each of the plurality of soft float function circuits 250a to 250n may operate based on clock signals applied from the outside. In this case, during the operation of the SoC 200, the floating point operation corresponding to a specific soft float function may not be necessary. In this case, clock signals applied to the soft float function circuit performing the floating point operation corresponding to the unnecessary soft float function may be cut off. Accordingly, soft float function circuits, in which clock signals are blocked, may be powered off. That is, because each of the soft float function circuits 250a to 250n is separated from the CPU 210, it may operate only when necessary. Accordingly, power consumption of the SoC 200 may be reduced.

In an embodiment, during the operation of the SoC 200, a floating point operation corresponding to a specific soft float function may not be required. In this case, a current applied to soft float function circuits that perform floating point operations corresponding to unnecessary soft float functions may be cut off. Accordingly, soft float function circuits, in which a current is cut off, may be turned off. That is, because each of the soft float function circuits 250a to 250n is separated from the CPU 210, it may operate only when necessary. Accordingly, power consumption of the SoC 200 may be reduced.

In other words, the SoC 200 according to an embodiment of the present disclosure may control the soft float function circuits 250a to 250n through clock gating or power gating. That is, each of the soft float function circuits 250a to 250n may be selectively turned on depending on an operating scenario of the SoC 200. Accordingly, the power consumed by each of the soft float function circuits may be reduced.

Figure 6:
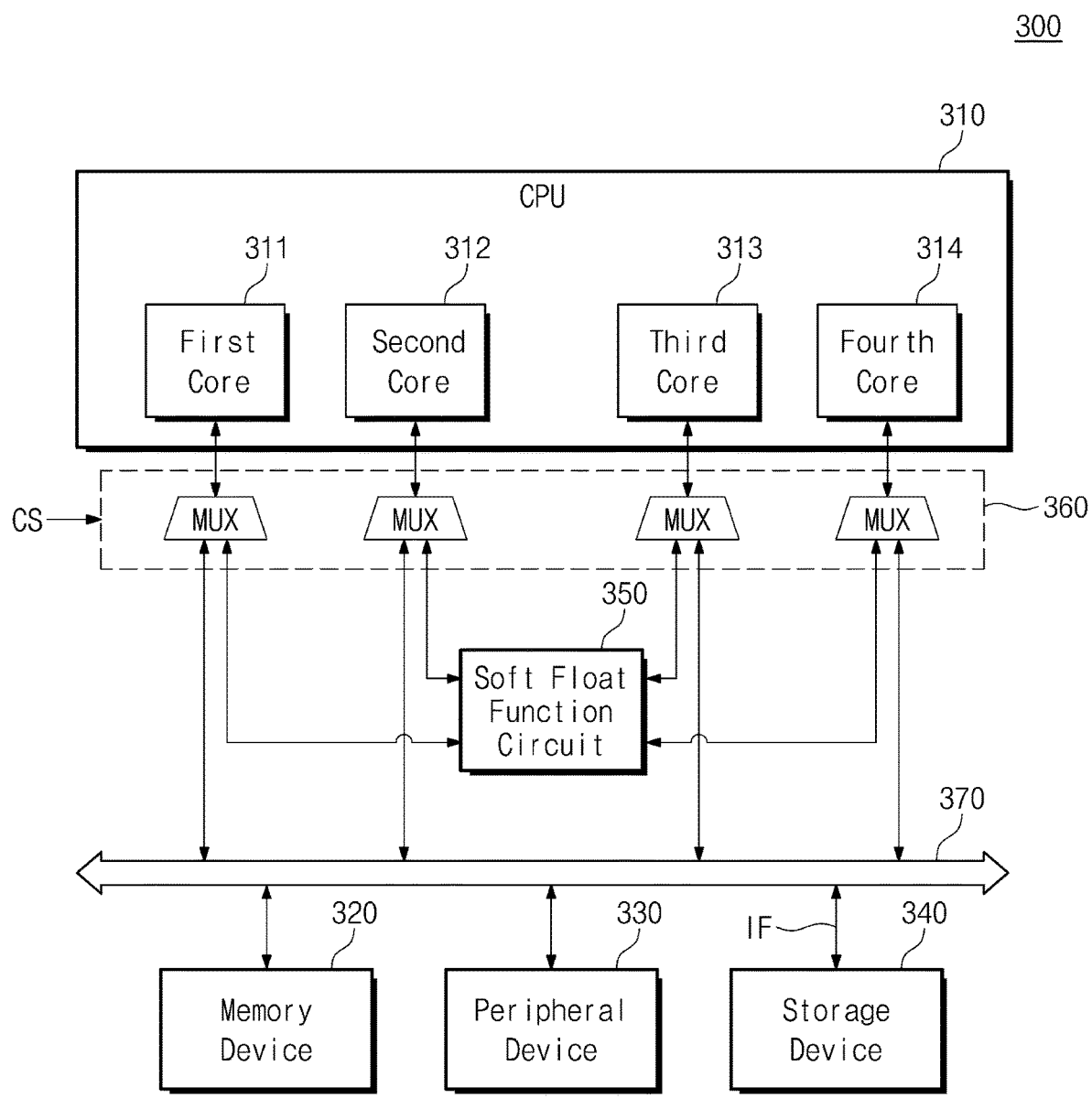
FIG. 6 is a diagram for describing another example of an SoC, according to an embodiment of the present disclosure.

FIG. 6 is a diagram for describing another example of an SoC, according to an embodiment of the present disclosure. Referring to FIG. 6, an SoC 300 may include a CPU 310, a memory device 320, a peripheral device 330, a storage device 340, a soft float function circuit 350, a multiplexer unit 360, and a system bus 370.

The memory device 320, the peripheral device 330, and the storage device 340 are described with reference to FIGS. 2 to 5, and thus, a detailed description thereof will not be repeated here.

The CPU 310 may perform various integer operations performed by an electronic device and may process data. The CPU 310 may communicate with other devices (e.g., the memory device 320, the peripheral device 330, and the storage device 340) through the interfaces IF, the multiplexer unit 360, and the system bus 370. The CPU 310 may communicate with the soft float function circuit 350 through the multiplexer unit 360 and the interfaces IF.

The CPU 310 may include a plurality of cores 311 to 314. FIG. 6 illustrates that the CPU 310 includes four cores 311 to 314, but the present disclosure is not limited thereto. Each of the cores 311 to 314 may perform only an integer operation. That is, the CPU 310 may not have a floating point operation function.

Each of the cores 311 to 314 may generate a function signal related to the floating point operation. The function signal may include a command for a target soft float function and parameters for the target soft float function. The cores 311 to 314 may share the soft float function circuit 350.

Each of the cores 311 to 314 may transmit a data signal to the soft float function circuit 350 through the interface IF and the multiplexer unit 360. The data signal may include pieces of data stored in the memory device 320. The pieces of data stored in the memory device 320 may be data required to perform a floating point operation corresponding to a target soft float function.

The soft float function circuit 350 may receive function signals and data signals from the CPU 310 through the multiplexer unit 360 and the interfaces IF. The soft float function circuit 350 may perform a floating point operation for implementing a function of a soft float function corresponding to a command included in the function signal. That is, the soft float function circuit 350 may perform the floating point operation corresponding to the target soft float function. The soft float function circuit 350 may transmit a result signal to the CPU 310 through the interfaces IF and the multiplexer unit 360. The result signal may include a result of the floating point operation based on a function signal and a data signal.

In other words, the soft float function circuit 350 may be a hardware device for implementing the function of the target soft float function. The soft float function circuit 350 may identify the target soft float function based on the command included in the function signal, and may perform the floating point operation corresponding to the target soft float function.

For example, as described with respect to FIGS. 3 and 4, the soft float function circuit 350 may include the floating point operation devices 251a to 251n and the controller 253. The soft float function circuit 350 may receive function signals and data signals transmitted from the cores 311 to 314.

For example, as described with respect to FIGS. 3 and 4, the soft float function circuit 350 may, sequentially or in parallel, perform floating point operations for implementing functions of soft float functions corresponding to commands included in function signals based on operations of the floating point operation devices 251a to 251n and the controller 253.

In an embodiment, the soft float function circuit 350 may perform floating point operations respectively corresponding to a plurality of soft float functions.

The multiplexer unit 360 may include a plurality of multiplexers MUX. The plurality of multiplexers MUX may be connected to the corresponding cores 311 to 314, the soft float function circuit 350, and the system bus 370 through the interface IF.

The multiplexer unit 360 may receive signals from external devices (e.g., the memory device 320, the peripheral device 330, and the storage device 340) through the system bus 370 and the interfaces IF. The multiplexer unit 360 may receive signals from the soft float function circuit 350 through the interface IF.

The multiplexer unit 360 may transmit a signal from external devices or a signal from the soft float function circuit 350 to a corresponding core (e.g., 311 to 314) based on a control signal CS. The multiplexer unit 360 may transmit signals from the cores 311 to 314 to the soft float function circuit 350 or the system bus 370 based on the control signal CS.

The system bus 370 may be connected to components (e.g., the memory device 320, the peripheral device 330, the storage device 340, and the multiplexer unit 360) of the SoC 300 through the interfaces IF. The system bus 260 may be a passage through which data or signals are transmitted between the components of the SoC 300.

The above description refers to embodiments for implementing the present disclosure. Embodiments in which a design is changed simply or which are easily changed may be included in the present disclosure as well as an embodiment described above. In addition, technologies that are easily changed and implemented by using the above embodiments may be included in the present disclosure. Accordingly, it will be apparent to those of ordinary skill in the art that various changes and modifications may be made to the above embodiments without departing from the spirit and scope of the present disclosure as set forth in the following claims.

According to an embodiment of the present disclosure, an SoC may include a CPU performing only an integer operation, and a soft float function circuit performing a floating point operation The CPU does not directly perform the floating point operation, thereby reducing design costs and power consumption.

While the present disclosure has been described with reference to embodiments thereof, it will be apparent to those of ordinary skill in the art that various changes and modifications may be made thereto without departing from the spirit and scope of the present disclosure as set forth in the following claims.

What is claimed is:
1. A system-on-chip (SoC) comprising:
a central processing unit (CPU) configured to generate a first function signal including a first command for a first soft float function while not having a floating point operation function;
a system bus; and
a soft float function circuit configured to:
receive the first function signal from the CPU through the system bus; and
perform a first floating point operation corresponding to the first soft float function based on the first command,
wherein the first function signal further includes a first parameter for the first soft float function,
wherein the soft float function circuit further includes:
a storage device configured to store the first command and the first parameter;

a plurality of floating point units (FPUs), each of which performs a floating point operation; and
a controller configured to control the plurality of FPUs and the storage device such that at least one FPU among the FPUs performs the first floating point operation in response to the first function signal,
wherein the CPU further generates a second function signal including a second command for a second soft float function, and
wherein the soft float function circuit is further configured to:
when receiving the first function signal from the CPU through the system bus, perform the first floating point operation corresponding to the first soft float function based on the first command;
when receiving the second function signal from the CPU through the system bus, perform a second floating point operation corresponding to the second soft float function based on the second command; and
when the soft float function circuit simultaneously receives the first function signal and the second function signal, the controller is configured to control the plurality of FPUs and the storage device such that the plurality of FPUs perform the first floating point operation and the second floating point operation in parallel.

2. The SoC of claim 1, wherein the storage device includes at least one of a first-in-first-out (FIFO) storage device, a register, and a memory.

3. The SoC of claim 1, wherein, when the soft float function circuit simultaneously receives the first function signal and the second function signal, the controller is further configured to allow the plurality of FPUs and the storage device to perform the second floating point operation after the plurality of FPUs perform the first floating point operation.

4. The SoC of claim 1, wherein the system bus is connected to the CPU through a first interface and is connected to the soft float function circuit through a second interface, and
wherein the soft float function circuit is configured to:
receive the first function signal from the CPU through the first interface, the system bus, and the second interface.

5. The SoC of claim 4, further comprising:
a memory device connected to the system bus through a third interface,
wherein the soft float function circuit is further connected to the system bus through a fourth interface.

6. The SoC of claim 5, wherein a transmission rate of the fourth interface is faster than a transmission rate of the second interface.

7. The SoC of claim 6, wherein the soft float function circuit further includes:
a direct memory access (DMA) engine configured to perform a DMA operation between the soft float function circuit and the memory device, and
wherein the soft float function circuit receives a data signal including data required to perform the first floating point operation from the memory device through the third interface, the fourth interface, and the system bus based on the DMA operation.

8. A system-on-chip (SoC) comprising:
a system bus;
a central processing unit (CPU) connected to the system bus through a first interface and configured to generate a first function signal including a first command for a first soft float function, and a second function signal including a second command for a second soft float function while not having a floating point operation function;
a first soft float function circuit connected to the system bus through a second interface and configured to receive the first function signal from the CPU through the first interface, the system bus, and the second interface and to perform a first floating point operation corresponding to the first soft float function based on the first command;
a second soft float function circuit connected to the system bus through a third interface and configured to receive the second function signal from the CPU through the first interface, the system bus, and the third interface and to perform a second floating point operation corresponding to the second soft float function based on the second command; and
a memory device connected to the system bus through a fourth interface and configured to store first data required for the first floating point operation, and second data required for the second floating point operation,
wherein the first soft float function circuit further includes:
a plurality of first floating point units (FPUs), each of which performs a floating point operation; and
a first controller configured to control the plurality of first FPUs and the first storage device such that at least one first FPU among the plurality of first FPUs performs the first floating point operation in response to the first function signal,
wherein the first function signal further includes a first parameter for the first soft float function,
wherein the first soft float function circuit further includes a first storage device configured to store the first command and the first parameter, and
wherein the first soft float function circuit is further configured to:
when receiving the first function signal from the CPU through the system bus, perform the first floating point operation corresponding to the first soft float function based on the first command;
when receiving the second function signal from the CPU through the system bus, perform a second floating point operation corresponding to the second soft float function based on the second command; and
when the first soft float function circuit simultaneously receives the first function signal and the second function signal, the first controller is configured to control the plurality of first FPUs and the storage device such that the plurality of first FPUs perform the first floating point operation and the second floating point operation in parallel.

9. The SoC of claim 8, wherein the first soft float function circuit further includes:
a direct memory access (DMA) engine further connected to the system bus through a fifth interface and configured to perform a DMA operation between the first soft float function circuit and the memory device,
wherein the first soft float function circuit is configured to:
receive a first data signal including the first data from the memory device through the fourth interface, the system bus, and the fifth interface, and
wherein a transmission rate of the fifth interface is faster than a transmission rate of the second interface.

10. The SoC of claim 8, wherein the SoC operates during a first period, and
  wherein, during the first period, the first soft float function circuit and the second soft float function circuit are selectively turned on.

* * * * *